United States Patent [19]

Beard

[11] Patent Number: 5,055,707

[45] Date of Patent: Oct. 8, 1991

[54] METHOD AND APPARATUS FOR SINGLE STEP CLOCKING ON SIGNAL PATHS LONGER THAN A CLOCK CYCLE

[75] Inventor: Douglas R. Beard, Eleva, Wis.

[73] Assignee: Supercomputer Systems Limited Partnership, Eau Claire, Wis.

[21] Appl. No.: 568,169

[22] Filed: Aug. 16, 1990

[51] Int. Cl.5 .............................................. G06F 11/30
[52] U.S. Cl. ...................................... 307/269; 371/61; 328/63; 328/72; 307/480
[58] Field of Search ...................... 371/61; 328/72, 63; 307/480, 269, 272.3; 377/30, 31, 32; 364/270, 271

[56] References Cited

U.S. PATENT DOCUMENTS

| | | | |
|---|---|---|---|
| 4,458,307 | 7/1984 | McAnlis et al. | 364/200 |
| 4,819,154 | 4/1989 | Stiffler et al. | 364/200 |
| 4,847,749 | 7/1989 | Collins et al. | 364/200 |
| 4,982,404 | 1/1991 | Hartman | 371/61 |

Primary Examiner—Stanley D. Miller
Assistant Examiner—Scott A. Ouellette
Attorney, Agent, or Firm—Dorsey & Whitney

[57] ABSTRACT

An apparatus and method allows for starting and stopping of computer system clocks where the propagation length of signal paths exceed one clock cycle in length. A circular source buffer is provided at the source end of a signal path and saves the data presented on the signal path during every clock cycle. When the system clock has been stopped and is to be restarted, the data stored in the source buffer is copied to a corresponding destination buffer located in the destination end of the signal path. A multiplexer under hardware control located at the destination end of the signal path determines whether the destination receives data from the destination buffer or from the signal path.

4 Claims, 3 Drawing Sheets

METHOD AND APPARATUS FOR SINGLE STEP CLOCKING ON SIGNAL PATHS LONGER THAN A CLOCK CYCLE

BACKGROUND OF THE INVENTION

1. Technical Field

The present invention generally pertains to the field of maintenance and diagnostic control of computer devices. In particular, it pertains to a method and apparatus for single step clocking of the computer device where signal paths exceed one clock cycle in length.

2. Background Art

It is well known in the art that single-stepping or N-stepping of computer system clocks is an essential tool in the debug and maintenance of computer systems. Single-stepping allows the computer state to be observed both immediately prior and immediately after the execution of a system clock cycle, while N-stepping allows similar observation over any number of system clock cycles. In the past, there has been little difficulty in providing N-step capability to computer systems. All that is required is the ability to controllably enable or disable the system clock at the request of the engineer performing debug or maintenance operations. However, in high performance computers having short clock cycles, merely controlling the system clock may not be sufficient to provide N-step capability to the computer. This is particularly true of high-speed supercomputers of the type produced by the assignee of the present invention.

Supercomputers are typically designed as synchronous machines, with internal data generated by a source latch during one clock cycle being used at a destination latch during a subsequent clock cycle. Although the internal data can propagate from the source latch to the destination latch very quickly, there is a certain amount of time between when the data leaves the source latch and when it arrives at the destination latch. If the system clock cycle is shorter than this propagation time, then data generated by the source latch on multiple successive clock cycles would be present in the signal path simultaneously, prior to any of the data reaching the destination latch.

This causes little problem in normal operation, with the destination latch being designed to expect data two or more clock cycles after its generation by the source latch. However, such an arrangement causes serious problems with the ability of the computer to function during stop and restart of the system clock. For example, if the system clock is stopped after receipt by the destination latch of the first data from the source latch, then the second data from the source latch which is already in the signal path will be lost. The problem occurs when attempting to restart the system clock, in that the data intended for the destination latch during the upcoming clock cycle has been lost and is no longer present on the signal path.

The traditional solution to this problem was to reduce the physical size of the computer as much as possible, eliminating all signal paths in excess of one clock cycle in length. While this alleviates the N-step problem, it places a limit on the complexity with which a computer can be designed. This is because given any particular computer technology, there are physical limitations to the amount of circuitry that can be placed in a given volume of space. Requiring only single clock length signal paths limits the available volume, which in turn limits the amount of circuitry and thus the circuit complexity.

Furthermore, there is tremendous competitive advantage in the supercomputer market for improved performance, and one way to improve the performance of supercomputers is to reduce the clock cycle time. This further limits the available space for circuitry and circuit complexity, which may actually limit the performance of the supercomputer.

As supercomputers become more complex and are designed with shorter clock cycles, there is an increasing desire to not be limited to signal paths shorter than a single clock cycle in length. Accordingly, there is a need for supercomputers to be able to stop, restart and N-step system clocks over signal paths in excess of one clock cycle in propagation length.

SUMMARY OF THE INVENTION

In accordance with the present invention, a method and apparatus is provided which allows starting, stopping, and N-stepping of system clocks when signal paths exceed a single clock cycle in length. This is accomplished by providing a buffer at the source latch, which stores a copy of the data presented by the latch during every system clock cycle. When the system clock is halted, any data in the signal path is "lost" data, in that it will continue to propagate to the destination latch but will not be received by the destination latch since the system clock is not running. A copy of this lost data will be retained in the source buffer. Prior to restarting the system clocks, this lost data is read from the source buffer via scan paths, and copied into a destination buffer associated with the destination latch. The destination latch receives data either from the signal path or from the destination buffer, as selected by a multiplexer. When the system clock is restarted, the lost data must first be presented to the destination latch, which is done by taking data from the destination buffer through the multiplexer and to the destination latch. When all lost data has been presented to the destination latch, the multiplexer then passes data from the signal path to the destination latch, returning to normal operation.

Accordingly, it is an object of the present invention to provide an apparatus and method for allowing maintenance operations to be performed on a computer system where signal paths exceed one clock cycle in propagation length.

It is a further object of the present invention to provide an apparatus and method for allowing stopping, restarting, and N-stepping of system clocks when signal paths exceed one clock cycle in length.

These and other objects of the present invention will become apparent with reference to the drawings, the detailed description of the preferred embodiment, and the appended claims.

BRIEF DESCRIPTION OF THE DRAWINGS

FIGS. 1a, 1b and 1c show a sequence of signal propagations over a path which exceeds a clock cycle in propagation length.

DETAILED DESCRIPTION OF THE PREFERRED EMBODIMENT

Figure 1A:
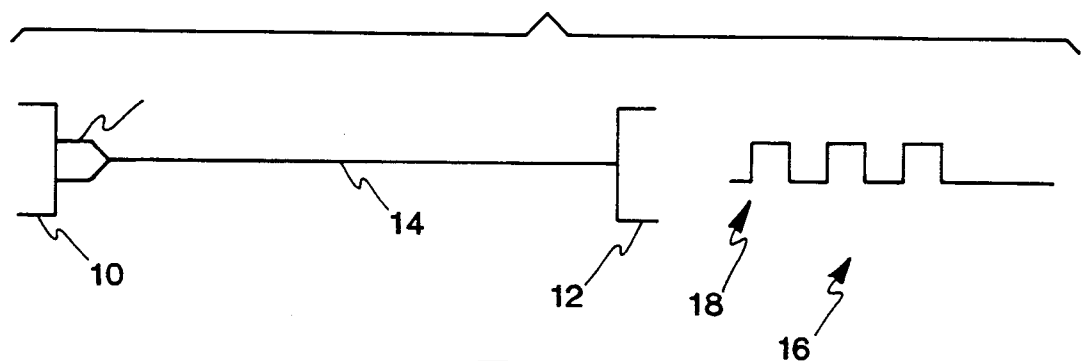
Figure 1B:
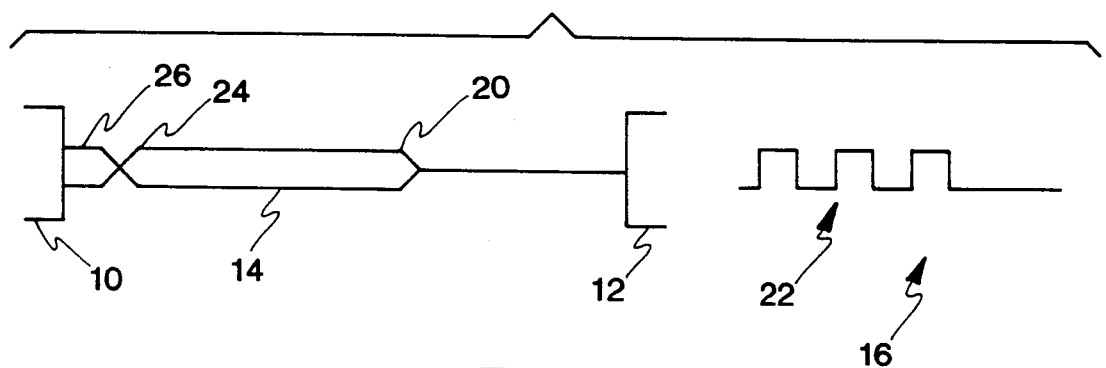

Referring now to FIGS. 1a, 1b and 1c, a sequence of signal propagations over a signal path which exceeds a clock cycle in length is shown. A source latch 10 provides data to a destination latch 12 via a signal path 14, which may be a physical path such as a wire or fiberoptic link, or any other communication path as is generally known in the art. A time representation of the system clock 16 is shown for each frame of the sequence. The presence of data on the signal path 14 is indicated by the portions of signal path 14 depicted by the presence of parallel, horizontal lines. In FIG. 1a, the first clock edge 18 results in the leading edge of first data 20 being presented by latch 10.

FIG. 1b shows the sequence having progressed to the second clock period 22, with the leading edge of the first data 20 having propagated substantially along the signal path 14. The second clock period 22 causes a trailing edge of the first data 24 and a leading edge of second data 26. When the sequence has progressed to the third clock cycle 28 as shown in FIG. 1c, the leading edge of the first data 20 has already reached the destination latch 12, but the trailing edge of first data has not yet reached the destination latch 24. The leading edge of the second data 26 has now propagated substantially down the signal path 14, and the third clock cycle 28 has caused a trailing edge of the second data 30 and a leading edge of the third data 32.

From the sequence shown in FIGS. 1a through 1c, it is seen that data presented to the signal path 14 during the first clock cycle 18 (FIG. 1a) is not available to the destination latch 12 until the third clock cycle 28 (FIG. 1c). This means that the clock cycle is shorter than the propagation length of the signal path 14. Under this circumstance, the problem encountered in stopping and restarting the system clock can be seen by referring again to FIG. 1c. Having taken the first data during the third clock cycle 28, destination latch 12 expects to take the second data during the next clock cycle. However, stopping the system clocks does not stop signals from propagating along the signal path 14. Thus the second data 26, 30 will continue to propagate toward the destination latch 12, only to be lost due to the fact that the system clock is not running, thus preventing the destination latch from taking the second data. Upon restarting the clocks, destination latch 12, which expects to receive the second data, will have either no data or erroneous data on the signal path, resulting in a system execution error.

Figure 2C:
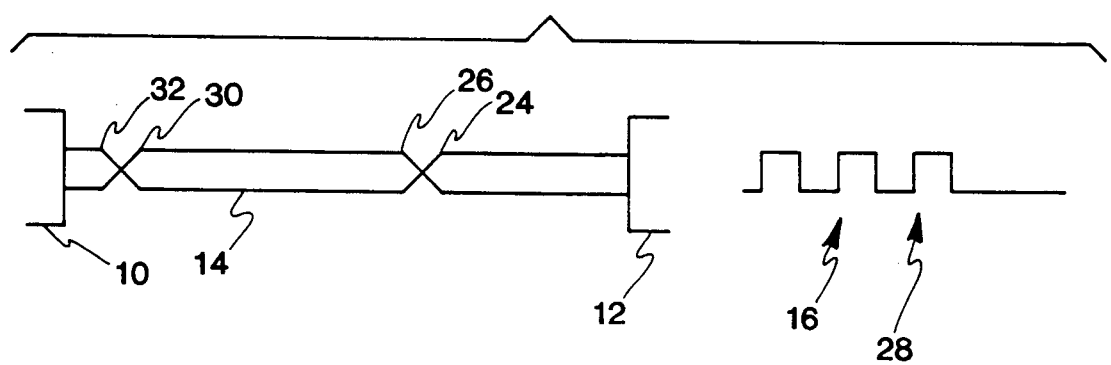
FIG. 2 shows a block diagram of an apparatus for allowing starting, stopping and N-stepping of system clocks.
Figure 2:
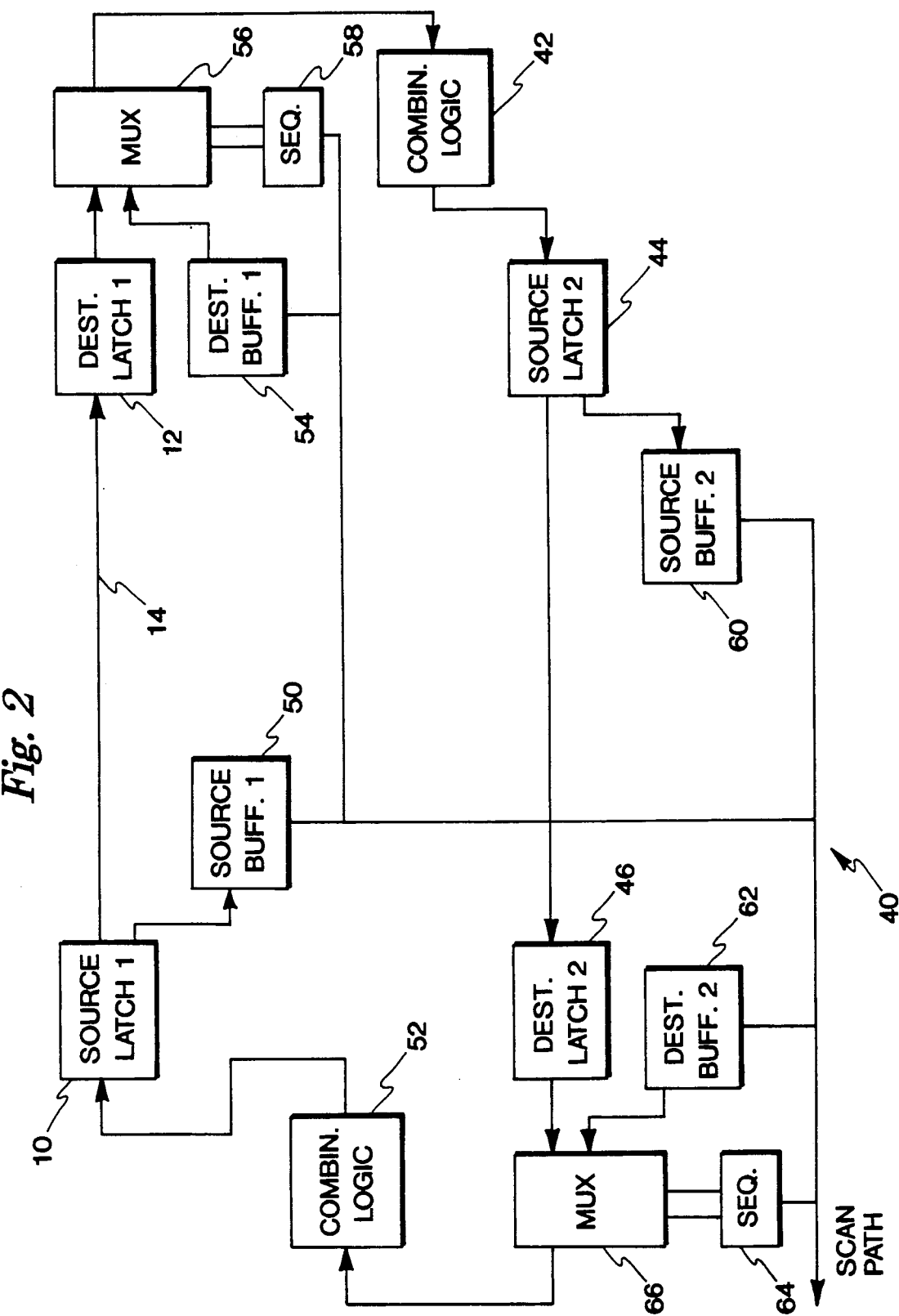

Referring now to FIG. 2, a block diagram of an apparatus for allowing stopping and restarting of system clocks 40 is shown. A portion of a typical synchronous machine is depicted, including a first source latch 10 and a first destination latch 12, connected via a signal path 14. Combinatorial logic 42 performs logic functions corresponding to the design of this stage of the machine. Signals from this stage may be passed back to the previous stage through second source latch 44 via a second signal path to a second destination latch 46. Again, combinatorial logic 52 performs the logic functions required of this stage of the machine.

According to the preferred embodiment of the present invention, a first source buffer 50 is connected to the source latch 10, wherein the buffer 50 stores the data presented by the source latch 10 on every system clock cycle. The source buffer 50 is preferably circular in that it need not retain data from every previous clock cycle, but only the most recent clock cycles. When the system clock is stopped, the lost data as described in reference to FIG. 1c is present in the source buffer 50. Prior to restarting the clock, a computer maintenance system (not shown) reads the lost data from the source buffer 50 via a scan path in a manner known in the art. The data is then copied via scan path to a destination buffer 54 located near the destination latch 12. Upon restarting the clock, the lost data now present in destination buffer 54 is presented to combinatorial logic 42, rather than data from the destination latch 12, with the selection being accomplished by multiplexer 56. Upon exhaustion of the lost data, multiplexer 56 switches to allow data from the destination latch 12 to reach the combinatorial logic 42, returning to normal operation.

The source buffer 50 and destination buffer 54 could be designed as a first in first out (FIFO) buffer, a normal memory array addressed using a counter, or any other appropriate storage means, as is known in the art. The depth of the source buffer 50 and destination buffer 54 is not critical, but must be sufficient to retain all the lost data, which depends upon the propagation length of the signal path relative to the system clock cycle period. The multiplexer 56 can be controlled by the counter or FIFO associated with destination buffer 54 in a manner known in the art. Note that while the depth of the destination buffer 54 is not critical, knowing how many bytes of lost data are present within the buffer is critical. The multiplexer 56 must be switched to allow propagated data from the destination latch 12 to reach the combinatorial logic 42 on the clock cycle after which the last of the lost data has been presented to the combinatorial logic 42.

The multiplexer 56 is controlled by a sequencer 58, which may be a down counter, preloaded with the number of lost data bytes, and which effects the switching of multiplexer 56 to destination latch 12 data when the counter reaches zero. Using a counter for the sequencer 58 allows the counter to also be used to address memory locations in the destination buffer 54, if desired. Those skilled in the art will recognize that any number of multiplexer control mechanisms may be used without departing from the scope of the present invention. For example, if the number of lost data bytes is relatively small, then the destination buffer 54 may be an array of registers, with the output of each being connected to an input of the multiplexer 56. In this alternate embodiment, the sequencer 58 is a counter with the counter bits connected to the multiplexer control lines.

Operation relative to the second source latch 44 and second destination latch 46 is identical to that described above. A second source buffer 60 saves the lost data, the scan path reads the lost data and writes it into the second destination buffer 62. A sequencer 64 controls whether data from the second destination latch 46 or data from the second destination buffer 62 is presented through the second multiplexer 66 to the combinatorial logic 52.

Figure 3:
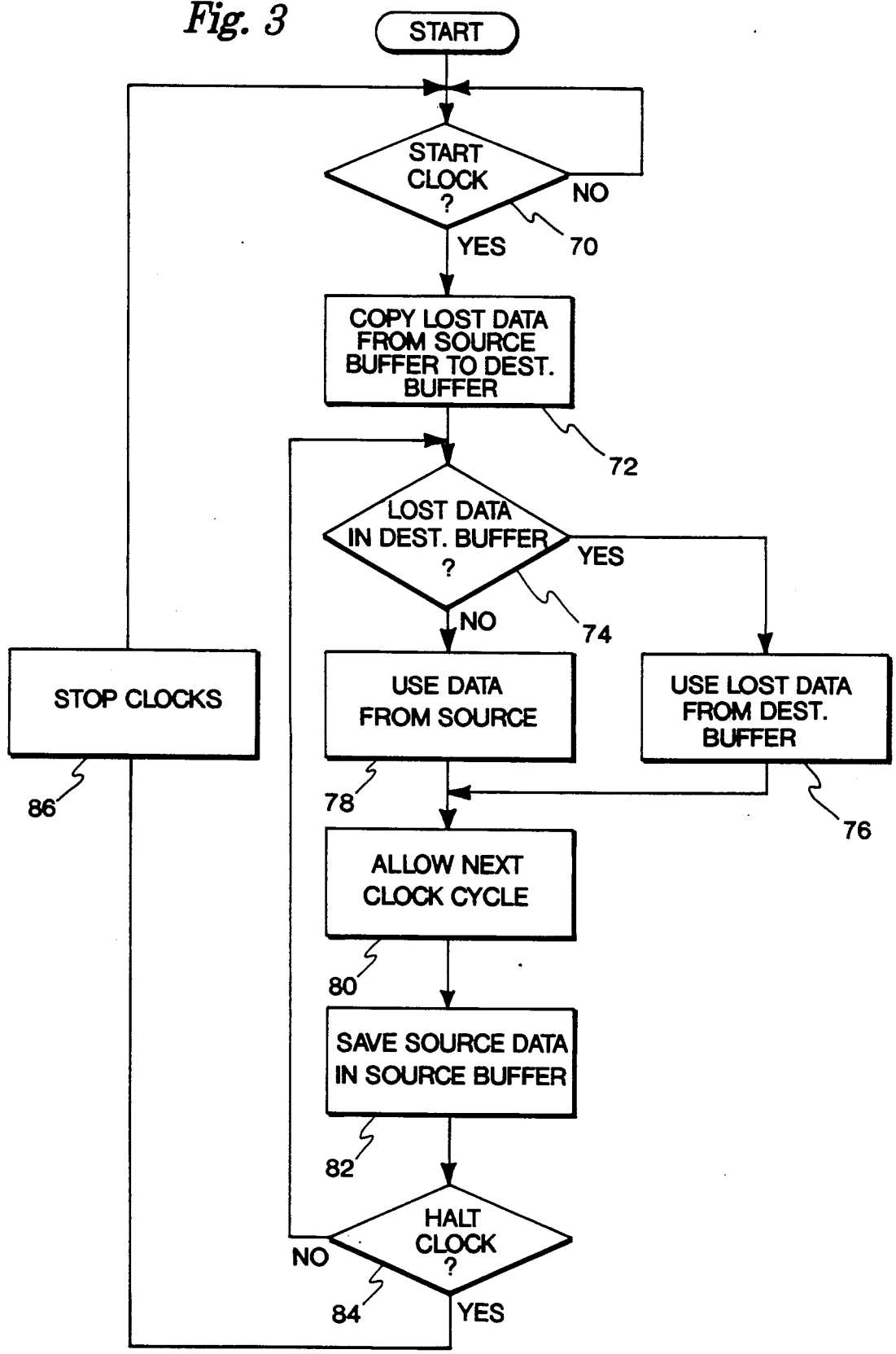
FIG. 3 shows a flow chart of a method for starting, stopping and N-stepping system clocks, and the restoration of lost data.

Referring now to FIG. 3, a flow chart of a method for controlling the stopping and restarting of system clocks is shown. The system clocks are under the control of a maintenance system, which waits until it is instructed to start the system clocks at step 70. The first step in starting the system clocks from a stopped condition is to copy lost data from the source buffer to the destination buffer at step 72. If the clocks are started during a system initialization procedure, there will of course be no lost data to copy. The hardware then determines whether there is lost data in the destination buffer at step 74, and if there is, the multiplexer (56 in FIG. 2) is switched to allow data from the destination buffer to be presented to the destination latch at step 76. If there is no lost data in the destination buffer at step 74, then the multiplexer is switched to present data from the source latch to the destination latch at step 78. The system clock is then enabled at step 80. During the next clock cycle, data presented by the source latch is saved in the source buffer at step 82. If it is desired for the clocks to continue running at step 84, then the method loops back to again test for lost data in the destination buffer at step 74. If the clocks are to be stopped at step 84, then they are stopped at step 86 and the method waits until it is desired to start the clocks once again at step 70.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

What is claimed is:

1. In a circuit with synchronous system clock cycles and a signal path having a source end, a destination end, and a propagation time between the source end and the destination end greater than a single clock cycle time, an apparatus for restarting signal transmission between the source end and destination end, comprising:
    means for presenting signals at said source end of said signal path;
    means for receiving signals at said destination end of said signal path;
    means for storing signals operably connected to said source end of said signal path; and
    means for presenting to said destination end of said signal path a predetermined number of signals stored in said means for storing, and wherein said signals are presented during a restart of an interrupted transmission.

2. A method for restarting signal transmission between a source end and a destination end of a signal path, the source end and the destination end having synchronous system clock cycles and the signal path having a propagation time between the source end and the destination end longer than one clock cycle, the method comprising the steps of:
    during a normal transmission, performing on each clock cycle the steps of:
        presenting a signal at the source end associated with that clock cycle; and
        storing the signal in a source buffer operably connected to the source end; and
    during a restart of an interrupted transmission, presenting to the destination end a predetermined number of signals stored in the source buffer.

3. The method of claim 2 wherein the step of presenting to the destination end a predetermined number of signals is comprised of the steps of:
    providing the destination end with a destination buffer operably connected to the destination end and a means for multiplexing signals operably connected to the source end, the destination end and the destination buffer and responsive to a mux control signal representing the predetermined number of signals;
    setting the mux control signal to transfer the signals from the destination buffer;
    restarting the system clock;
    transferring the predetermined number of signals from the source buffer to the destination buffer; and
    setting the mux control signal to transfer the signals from the source end.

4. The method of claim 2 wherein the step of presenting to the destination end a predetermined number of signals is comprised of the steps of:
    providing the source end with a means for multiplexing signals operably connected to the source end, the destination end and the source buffer and responsive to a mux control signal representing the predetermined number of signals;
    setting the mux control signal to transfer the signals from the source buffer;
    transferring the predetermined number of signals from the source buffer to the destination end;
    setting the mux control signal to transfer the signals from the source end; and
    restarting the system clock.

* * * * *

UNITED STATES PATENT AND TRADEMARK OFFICE
CERTIFICATE OF CORRECTION

PATENT NO. : 5,055,707
DATED : October 8, 1991
INVENTOR(S) : Douglas R. Beard

It is certified that error appears in the above-identified patent and that said Letters Patent is hereby corrected as shown below:

Col. 3, line 62, delete "52" and insert -- 48 -- therefor;

Col. 4, line 7, after "path" insert --52-- therefor;

Col. 4, line 8, after "path" insert --52 -- therefor;

Col. 4, line 54, after "path" insert --52-- therefor.

Signed and Sealed this

Fourth Day of May, 1993

Attest:

MICHAEL K. KIRK

Attesting Officer

Acting Commissioner of Patents and Trademarks